United States Patent
Haase et al.

(10) Patent No.: US 8,972,340 B1
(45) Date of Patent: Mar. 3, 2015

(54) MANAGING PROPERTIES COLLECTION

(75) Inventors: David Haase, Fuquay Varina, NC (US);
Miles A. DeForest, Bahama, NC (US);
Paul Thomas McGrath, Bahama, NC
(US); Dayanand Suldhal, New Canaan,
CT (US); Nagapraveen V. Seela, Cary,
NC (US); Michael C. Brundage,
Lexington, SC (US)

(73) Assignee: EMC Corporation, Hopkinton, MA (US)

( * ) Notice: Subject to any disclaimer, the term of this patent is extended or adjusted under 35 U.S.C. 154(b) by 344 days.

(21) Appl. No.: 13/535,918

(22) Filed: Jun. 28, 2012

(51) Int. Cl.
*G06F 17/30* (2006.01)

(52) U.S. Cl.
USPC ........... 707/609; 707/821; 707/822; 707/827; 709/223

(58) Field of Classification Search
None
See application file for complete search history.

(56) References Cited

U.S. PATENT DOCUMENTS

| 2007/0094378 | A1* | 4/2007 | Baldwin et al. | 709/223 |
| 2008/0126663 | A1* | 5/2008 | Murakami et al. | 710/311 |

* cited by examiner

*Primary Examiner* — Anh Tai Tran
(74) *Attorney, Agent, or Firm* — Krishnendu Gupta; Jason A. Reyes

(57) ABSTRACT

A method is used in managing properties collection. Storage objects for which properties information is to be refreshed are determined. A bulk request for properties information from file systems corresponding to the storage objects is generated and is issued to the file systems. Based on a response to the bulk request, a blocking transaction is used to update a model of the storage objects that is made available to management software.

18 Claims, 10 Drawing Sheets

MANAGING PROPERTIES COLLECTION

BACKGROUND

1. Technical Field

This application relates to managing properties collection.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems, also referred to as server systems, may store and retrieve data using a storage device containing a plurality of host interface units, disk drives, and disk interface units. The host systems access the storage device through a plurality of channels provided therewith. Host systems provide data and access control information through the channels to the storage device, and the storage device provides data to the host systems also through the channels. The host systems do not address the disk drives of the storage device directly, but rather, access what appears to the host systems as a plurality of logical disk units (also referred to as logical volumes or LUNs). The logical disk units may or may not correspond to the actual disk drives. Allowing multiple host systems to access the single storage device unit allows the host systems to share data stored therein.

Configuration and performance information may be associated with a data storage system. The configuration information may include information describing the physical and/or logical configuration in the data storage system. The logical configuration information may include, for example, information regarding logical objects such as RAID groupings, logically defined devices, and the like.

SUMMARY OF THE INVENTION

A method is used in managing properties collection. Storage objects for which properties information is to be refreshed are determined. A bulk request for properties information from file systems corresponding to the storage objects is generated and is issued to the file systems. Based on a response to the bulk request, a blocking transaction is used to update a model of the storage objects that is made available to management software.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Described below is a technique for use in managing properties collection, which technique may be used to provide for, among other things, getting file system and file properties in bulk. In particular in an example implementation in which properties of interest may be spread over several objects within a mapped LUN driver, in accordance with the technique, such properties are gathered in bulk and aggregated at a useful level and on a configurable interval, in a refresh operation ("refresh"). The refresh can be interrupted and restarted when certain events of interest occur, and also allows for a more accurate breakdown of the properties to help enable a better understanding of how system resources are used.

Figure 1:
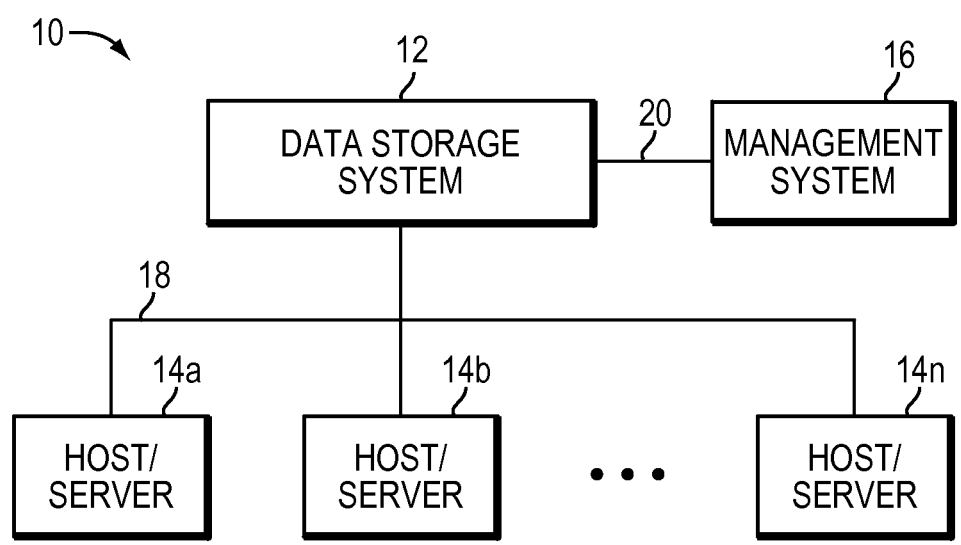
FIG. 1 is an example of an embodiment of a computer system that may utilize the techniques described herein.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSCI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also be included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices such as, for example, an ATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like. The dynamic aspects of performance characteristics may include, for example, aspects related to current I/O performance such as AST (average service time) representing the average amount of time it takes to service an event (e.g., service an I/O request), ART (average response time) based on the AST, and the average amount of time the I/O request waits. Dynamic aspects may also include, for example, utilization of different data storage system resources (e.g., particular logical or physical devices, CPU), measurement of cache hits and/or misses, and the like. The dynamic aspects may vary with application workload, such as when particular applications may be more heavily performing I/O operations.

Given the different performance characteristics, one or more tiers of storage devices may be defined as described below. The physical devices may be partitioned into tiers based on the performance characteristics of the devices; grouping similar performing devices together. An embodiment using the techniques herein may define a hierarchy of multiple tiers. Conversely, the particular performance characteristics may be applied to a storage pool (described below) with or without the definition of tiers. The set of resources associated with or designated for use by a tier or grouping within a pool may be characterized as a dynamic binding in that the particular set of data storage system resources utilized by consumers in a tier may vary from time to time. A current configuration for the data storage system, static aspects of the current data storage system resources (e.g., types of devices, device storage capacity and physical device characteristics related to speed and time to access data stored on the device), and current workload and other dynamic aspects (e.g., actual observed performance and utilization metrics) of the data storage system may vary at different points in time.

A storage pool may be a collection of disks, which may include disks of different types. Storage pools may further be subdivided into slices; for example a 1 GB slice may be the allocation element for a logical unit. As well, a pool may be used synonymously with a storage tier or a set of storage tiers. That is, both a storage tier and a pool may have storage devices of different performance capabilities and costs. As well, both may contain slices (also referred to as "data slices"). A slice may be considered the smallest element that can be tracked and moved. It may be advantageous to store the hot or most accessed data on the devices within the storage pool with the best performance characteristics while storing the cold or least accessed data on the devices that have slower performance characteristics. This can lead to a lower cost system having both faster and slower devices that can emulate the performance of a more expensive system having only faster storage devices.

A storage tier or a storage pool may be a collection of storage containers. A storage container may be a unit of storage including a set of storage extents. A storage extent is a logical contiguous area of storage reserved for a user requesting the storage space. For example, a storage tier may include three storage containers, each storage container including a set of disks and the set of disk in each storage container having different RAID levels.

A disk may be a physical disk within the storage system. A LUN may be a logical unit number which is an identifier for a Logical Unit. Each slice of data may have a mapping on the location of the physical drive where it starts and ends; a slice may be sliced again.

Figure 2A:
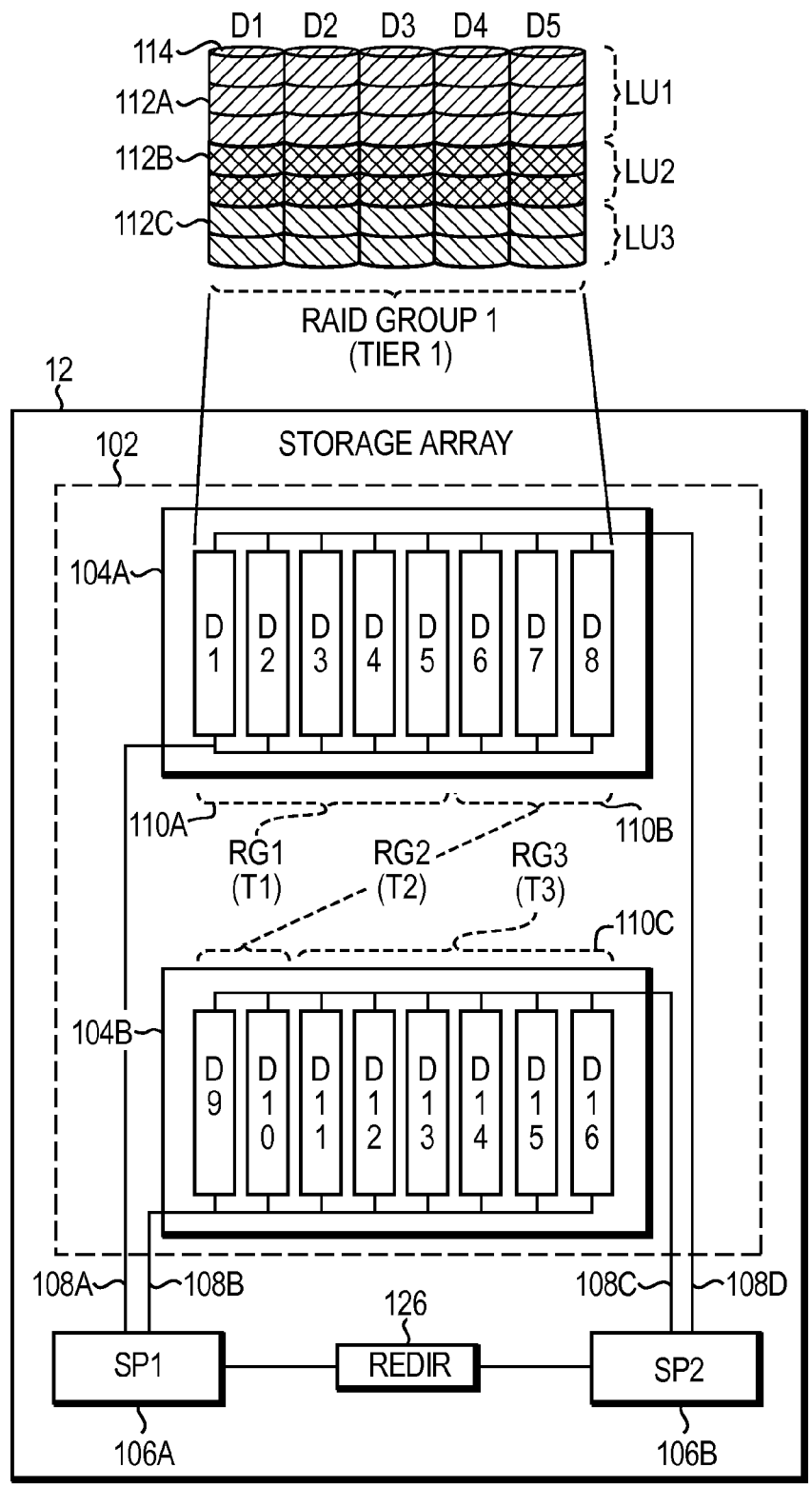
FIGS. 2A and 2B are an example of an embodiment of a computer system that may utilize the techniques described herein.
Figure 2B:
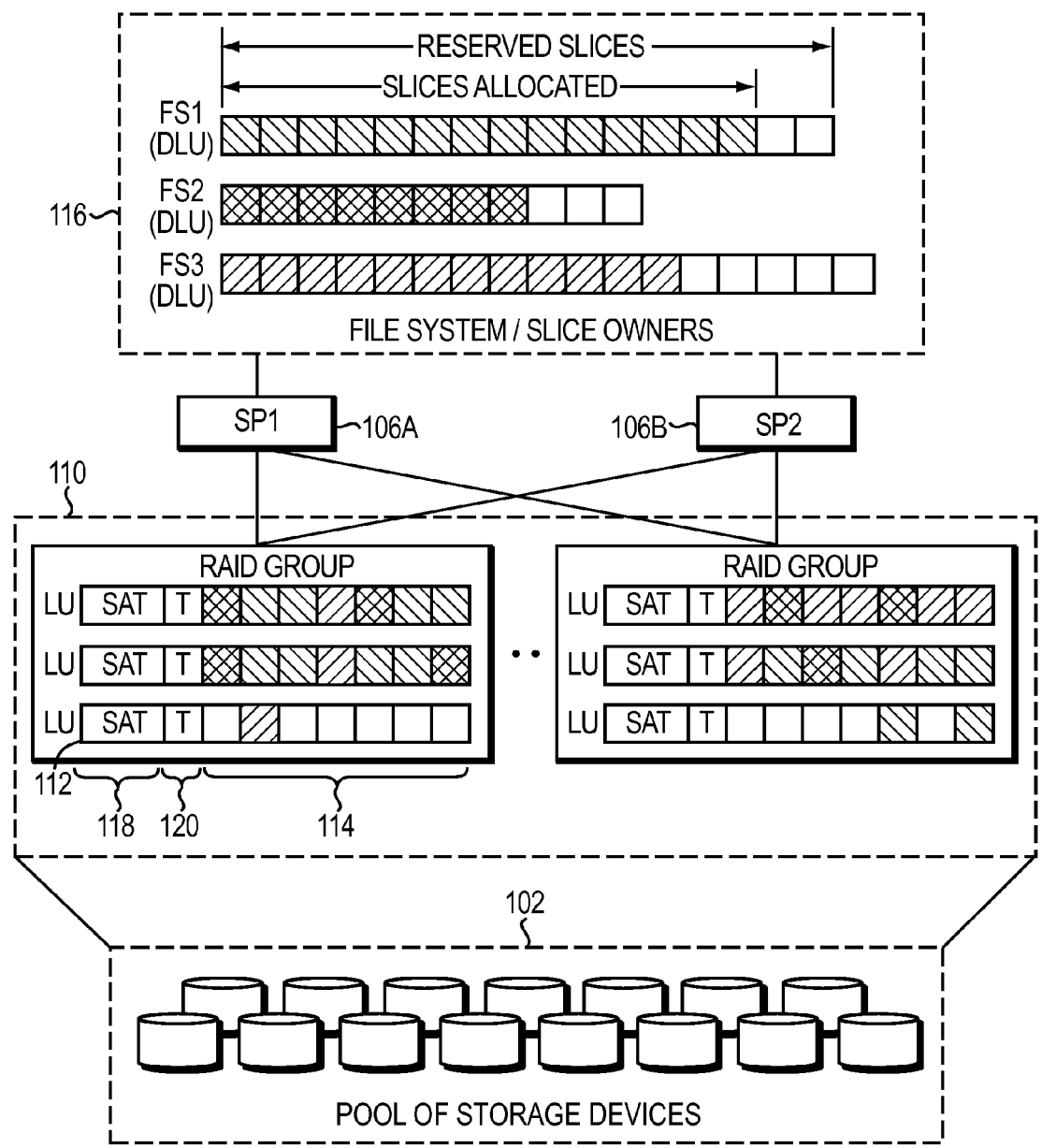

Referring to FIGS. 2A and 2B, shown are examples of an embodiment of a computer system that may be used in connection with performing the techniques described herein.

FIG. 2A shows a storage system that comprises a storage array 12. Storage array 12 includes multiple storage devices 102, which are typically hard disk drives, but which may be tape drives, flash memory, flash drives, other solid state drives, or some combination of the above. Storage devices 102 may have various differences in capabilities based on physical characteristics of underlying storage media, e.g., flash memory may be extremely fast compared to tape storage which may be relatively large and cheap. As used herein, storage media may also be referred to as physical media. Storage media may include any of various computer readable media, e.g., hard disks, floppy disks, disks, tapes, discs, solid state memory, optical discs, and flash memory. In at least one embodiment, storage devices 102 may be organized into tiers or classes of storage based on characteristics of associated storage media. For example, flash-based storage device 102 may be tier 1 storage, hard disk-based storage device 102 may be tier 2 storage, and tape-based storage devices 102 may be tier 3 storage.

In at least one embodiment, the storage devices 102 may be organized into multiple shelves 104, each shelf containing multiple devices 102. In the embodiment illustrated in FIG. 2A, storage array 12 includes two shelves, Shelf1 104A and Shelf2 104B; Shelf1 104A contains eight storage devices, D1-D8, and Shelf2 also contains eight storage devices, D9-D16. Storage array 12 may include one or more storage processors 106, for handling input/output (I/O) requests and allocations of hosts or server systems. For example, hosts or servers, such as VMWare ESX servers, may be connected to storage processors 106 using FC or Internet small computer system interface (ISCSI) connections. Each storage processor (SP) 106 may communicate with storage devices 102 through one or more data buses 108.

In at least one embodiment, storage array 12 contains two storage processors, SP1 106A, and SP2 106B, and each storage processor 106 has a dedicated data bus 108 for each shelf 104. For example, SP1 106A is connected to each storage device 102 on Shelf1 104A via a first data bus 108A and to each storage device 102 on Shelf2 104B via a second data bus 108B. SP2 106 is connected to each storage device 102 on Shelf1 104A via a third data bus 108C and to each storage device 102 on Shelf2 104B via a fourth data bus 108D. In this manner, each device 102 is configured to be connected to two separate data buses 108, one to each storage processor 106. For example, storage devices D1-D8 may be connected to data buses 108A and 108C, while storage devices D9-D16 may be connected to data buses 108B and 108D. Thus, each device 102 is connected via some data bus to both SP1 106A and SP2 106B. The configuration of storage array 12, as illustrated in FIG. 2A, is for illustrative purposes only, and is not considered a limitation of the current technique described herein.

In addition to the physical configuration, storage devices 102 may also be logically configured. For example, multiple storage devices 102 may be organized into redundant arrays. In at least one embodiment, redundant arrays comprise redundant array of inexpensive disks (RAID) groups, or RGs 110, shown in FIG. 2A as RG1 110A, RG2 110B, and RG3 110C. RGs may be created or based on a various factors, including proximity of storage devices, utilization goals, capacity needs, physical characteristics of storage devices 102, and other factors. In at least one embodiment, RGs are based on tiers generally determined by physical characteristics of storage devices (e.g., fast, high quality devices D1-D5 may be tier 1 storage devices, and, as such, may be organized into a given RG 110). Such physical characteristics of storage devices for determining tiers may include but is not limited to capacity of storage device, access speed of storage device (e.g., revolution per minute (RPM) for disk-based media and throughput for solid state media), and type of storage device (e.g., flash, hard disk, and floppy).

In the embodiment illustrated in FIG. 2A, storage devices D1-D5 are tier 1 storage. D1-D5 are organized into a first RAID group, RG1 110A. Storage devices D6-D10 are tier 2 storage. D6-D10 are organized into a second RAID group, RG2 110B. Storage devices D12-D16 are tier 3 storage. D12-16 are organized into a third RAID group, RG3 110C. In at least one embodiment, a RAID group may span multiple shelves and/or multiple buses. For example, RG2 110B includes storage devices from both Shelf1 104A and Shelf2 104B.

Although RAID groups are composed of multiple storage devices, a RAID group may be conceptually treated as if it were a single storage device. As used herein, the term "storage entity" may refer to either a single storage device or a RAID group operating as a single storage device. In at least one embodiment, storage entities are associated with tiers or classes of storage. Storage entities may be further sub-divided into logical units. A single RAID group or individual storage device may contain one or more logical units. In at least one embodiment, slices are logical units, or portions therein, of storage area. As used herein, storage area refers to storage space of one or more storage entities in a storage system. Slices may be any size and may be associated with storage media from one or more storage entities. In at least one embodiment, slices are constant-sized portions of storage associated with one storage device 102, or a storage media therein, in storage array 12 (e.g., a 1 gigabyte (GB) slice from D2).

In the embodiment illustrated in FIG. 2A, RG1, which includes storage devices D1-D5, is sub-divided into 3 logical units, LU1 112A, LU2 112B, and LU3 112C. Each LU 112 is sub-divided into multiple slices.

FIG. 2B is a block diagram illustrating another view of a data storage system for managing logical volumes in the data storage system according to an embodiment of the current technique described herein. In the simplified view shown in FIG. 2B, a pool of storage devices 102 are organized into multiple RAID groups 110, and each RAID group is further divided into a number of LUs. Slices 114 may be allocated to one or more mapped LUs for use by users of storage array 12. As used herein, a mapped LU refers to a logical portion of storage space that represent contiguous and/or non-contiguous physical storage space, where mapping allows for physical storage space to be dynamically linked together at a time of use into a logically contiguous address space. Exemplary examples of mapped LUs may include thin logical units (TLUs) and direct logical units (DLUs). A thin logical unit ("TLU") is a sparsely populated logical unit (LU) provisioned at creation but which is not allocated any storage until the storage is actually needed. A "direct logical unit" or "DLU" (also referred to as "direct mapped LUN") is a fully provisioned mapped LU with coarse mapping. A DLU is seen as fully provisioned by a user, but, depending on the implementation, internally storage space may be allocated on as needed basis, or the user can specify whether a DLU is fully provisioned up front or the storage space is internally allocated as needed.

Further, a file created on a direct logical unit is laid out linearly on a disk, with all data blocks of the file located through an arithmetic mapping and does not require any lookup or a mapping operation to locate a data block on the disk.

As shown in FIG. 2B, LUs may be implemented using file systems (e.g., common block file system ("CBFS")) or other storage architecture. In at least some embodiments, LUs may be implemented using additional or different architecture (e.g., without traditional file systems). As used hereinafter, a file system (FS) 116 is a collection of slices and may be referred to as the slice owner of the collection of slices by the storage system 12. An FS 116 may represent a drive, a volume, or storage space for use by a user of storage array 12. In at least one embodiment, FS 116 may refer to a direct LUN (DLU) for use by a user of the storage array 12.

A DLU or FS 116 may be associated with a reserved space size and an actual space size. The reserved size may be the size presented to the user. The actual size is determined by the number of slices actually allocated to FS 116. The slices that are allocated to an FS 116 may be physically or virtually located anywhere in storage array 12 and may depend on a variety of factors, e.g., a slice allocation policy, user's requirements, and storage array configuration. For example, slices of an FS 116 may be physically located contiguously or non-contiguously in storage devices 102 and/or logically located contiguously or non-contiguously in LUs 112.

In at least one embodiment, storage processors 106 may be responsible for reserving and allocating storage space. Additionally, storage processors 106 may maintain information about the reserved and/or allocated storage space. For example, storage processors 106 may be responsible for determining whether an FS 116 have reserved slices left to allocate and whether a storage pool has available slices for reservation or consumption.

In at least one embodiment, storage processor 106 may maintain information about an FS 116 whose contents are being stored in the allocated slices, including the amount of reserved slices that FS 116 has requested. In at least one implementation of storage array 12, each logical unit 112 is associated with a slice allocation table (SAT) 118, which is used to record information about each slice 114, such as whether the slice is free or allocated and, if it is allocated, to which slice owning entity (e.g., FS 116). SAT 118 may be stored in logical unit 112, or it may be stored outside logical unit 112 to which it is associated. Each logical unit may also be associated with one or more transactional sectors (T-sectors) 120, which may be used in tracking pool storage space reservations.

As described above, depending upon the physical characteristics of the data storage system, the collections of resources may have physical, electrical, or logical constraints on their use. Referring back to FIG. 2A, for example, in at lest one embodiment of the current technique, an LU 112 may span multiple storage entities, depending on the configuration of storage array 12 and configuration of the LU 112.

Referring back to FIG. 2B, a pool of storage devices 102 may be organized into multiple RAID groups 110, where each RAID group may be further divided into a number of LUs from which slices 114 are allocated. Slices that are allocated may be physically located anywhere in storage array 12.

Figure 3:
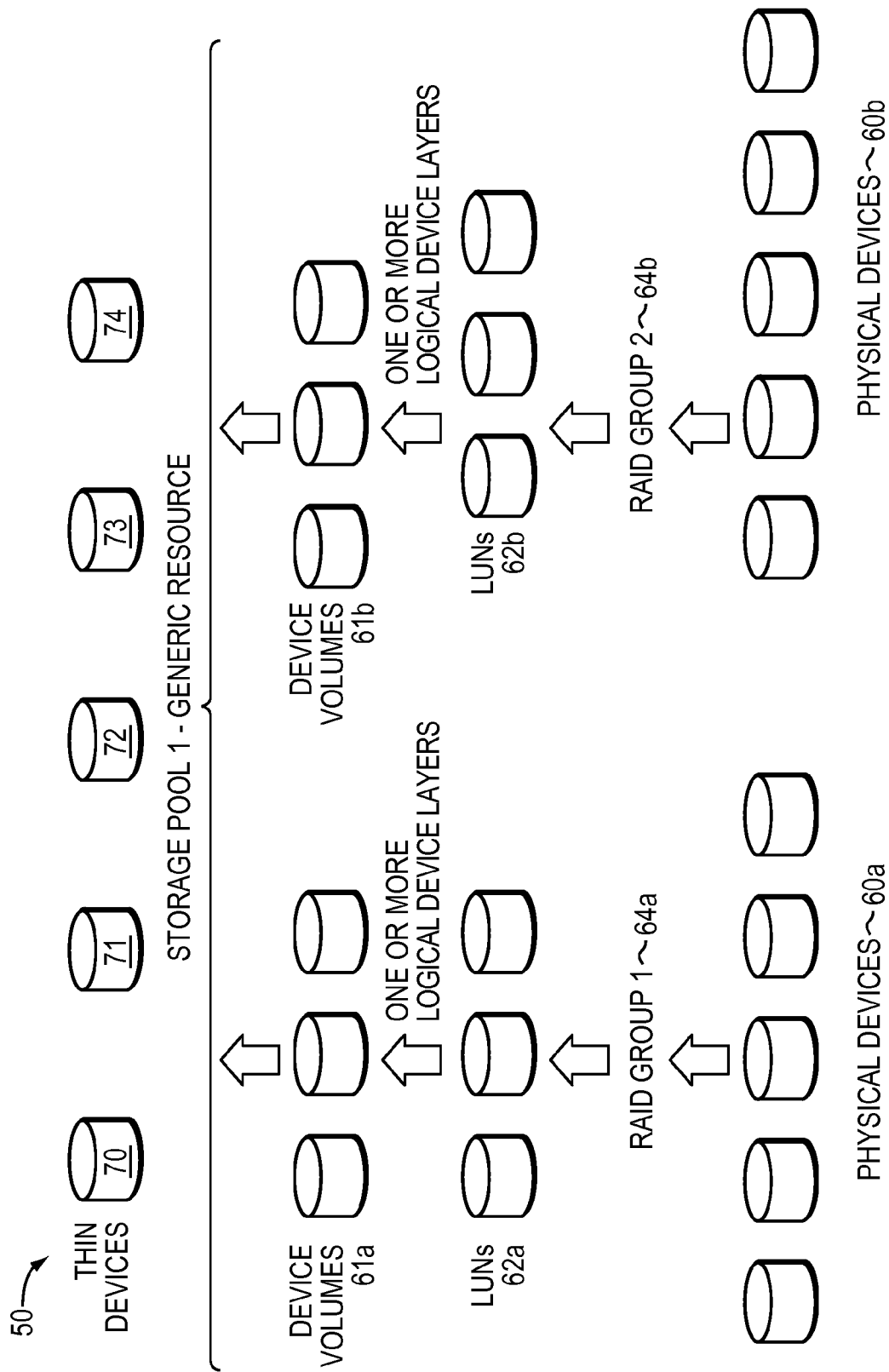
FIG. 3 is an example illustrating storage device layout.

Referring to FIG. 3, shown is an example representing how data storage system best practices may be used to form storage pools. The example 50 illustrates how storage pools may be constructed from groups of physical devices. For example, RAID Group1 64a may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 1 of the example 50 illustrates two RAID groups being used to define a single storage pool although, more generally, one or more RAID groups may be used for form a storage pool in an embodiment using RAID techniques.

The data storage system 12 may also include one or more thin devices 70-74. A thin device (also referred to as "thin logical unit") presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists are mapped to data devices such as device volumes 61a-61b, which are logical devices that map logical storage space of the data device to physical storage space on the physical devices 60a-60b. Thus, an access of the logical storage space of the thin device results in either a null pointer (or equivalent) indicating that no corresponding physical storage space has yet been allocated, or results in a reference to a data device which in turn references the underlying physical storage space.

Figure 4A:
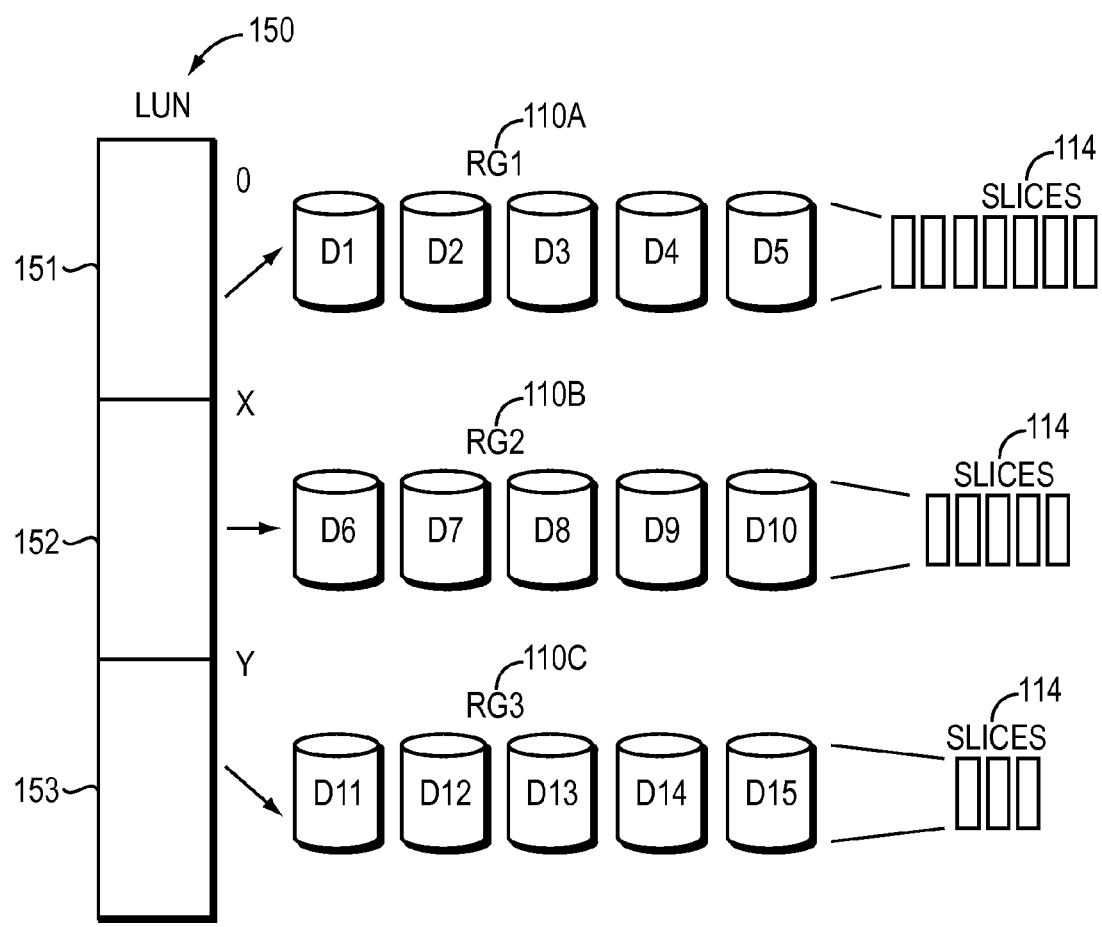
FIGS. 4A and 4B are simplified block diagrams of an exemplary system according to an embodiment of the techniques described herein.

Referring to FIG. 4A, shown is a diagram illustrating an exemplary logical division of a storage of a data storage system into storage objects (such as RAID groups) for configuring logical volumes in the data storage system that may be included in an embodiment using the techniques described herein. With reference also to FIGS. 2A and 2B, for example, storage entities 102 may refer to either a single storage device or a RAID group operating as a single storage device, may be further sub-divided into logical units. A single RAID group or individual storage device may contain one or more logical units (LUs) 112. However, RAID groups need not correspond to LUs and RAID groupings may be further divided into two or more LUs. In addition to RAID groups, each logical unit 112 may be further subdivided into portions of a logical unit, referred to as "slices" 114. Slices 114 may be allocated, de-allocated, re-allocated, reserved, or redistributed by a slice manger. The slice manager may be a software application or layer that is executed, at least in part, by one or more SPs 106. The slice manager may be responsible for implementing a slice allocation policy and/or algorithm. For example, the slice manager may receive slice allocation requests, and maintain relevant statistical information regarding slices.

Referring again to FIG. 4A, in at least one embodiment of the current technique, for example, a logical unit 150 is shown that includes slices allocated from three RAID groups (e.g. RG1 110A, RG2 110B, RG3 110C). The logical unit 150 is configured in such a way that a subset 151 of logical unit 150 starting at an offset 0 includes slices 114 from RG1 110A. A subset 152 of logical unit 150 starting at an offset "x" includes slices 114 from RG2 110B where "x" is any logical offset within the logical unit 150 that is greater than 0 and less than the logical size of logical volume 150. A subset 153 of logical unit 150 starting at an offset "y" includes slices 114 from RG3 110C where "y" is any logical offset within the logical unit 150 that is greater than "x" and less than the logical size of logical volume 150. It should be noted that the offsets "x" and "y" may be any value that may be used for configuring the logical unit 150, indicating an offset within the logical size of the logical unit 150.

Figure 4B:
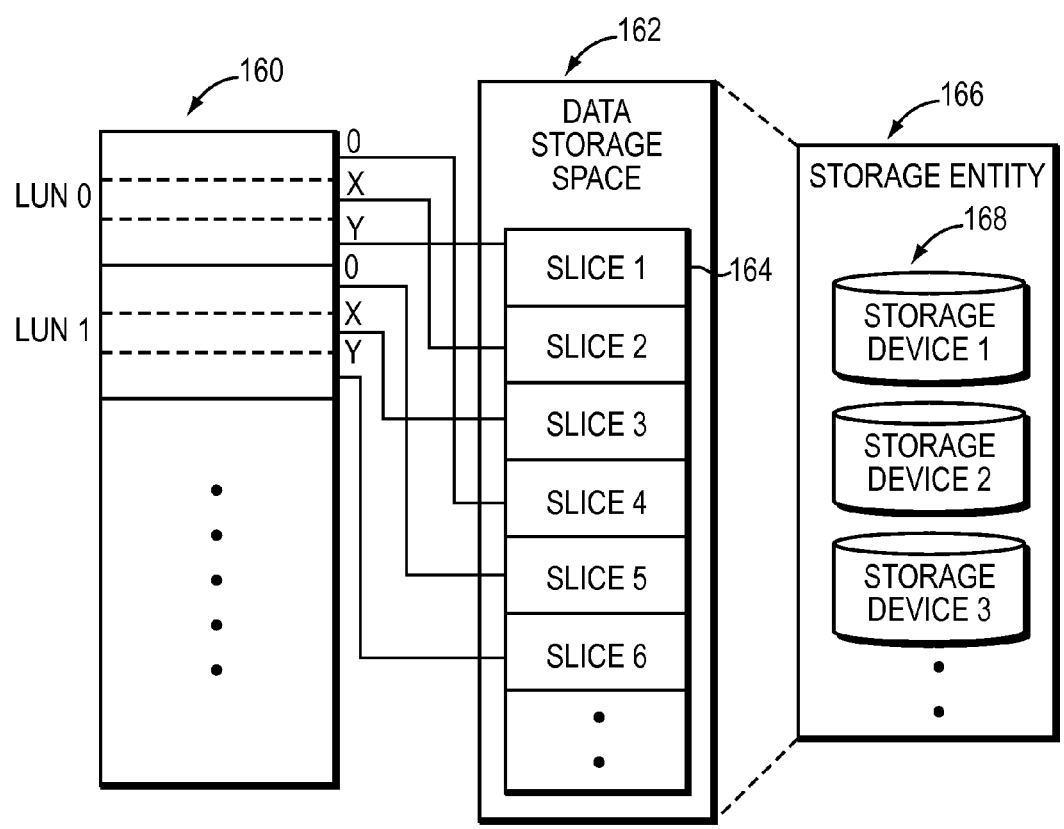

Referring to FIG. 4B, shown is a diagram illustrating another example of logical division of a storage of a data storage system into storage objects (such as RAID groups, storage devices, slices) for managing logical volumes in the data storage system that may be included in an embodiment using the techniques described herein. Data storage system 12 includes a storage entity 166 having data storage space for storing data. Storage entity 166 may include one or more storage devices 168, which may be hard disk drives, flash drives, or other devices capable of storing data. In at least one embodiment, a collection of hard disk drives may be organized into redundant array of inexpensive disks (RAID) arrays. The collective data storage capacity of storage devices 168 is represented by data storage space 162. Data storage space 162 may be divided into portions, hereinafter referred to as slices 164. In at least one embodiment of the current technique, for example, each slice 164 is approximately 1 gigabyte (GB) in size, but other sizes may be used. Slices 164 within data storage space 162 may be organized into logical units (LUs), which are commonly referred to as LUNs 160. In the example illustrated in FIG. 4B, data storage space 162 includes at least two LUNs, LUN0 and LUN1. One or more slices 164 are allocated to each LUN 160. For example, slices 1, 2, and 4 have been allocated to LUN0; slices 3, 5, and 6 have been allocated to LUN1; and slice 7 is unallocated to any LUN. Additionally, each LUN 160 may include slices allocated from different types of storage devices 168. For example, slice 1 allocated to LUN0 at an offset may be allocated from a storage device that is included in a faster storage tier and slice 2 allocated to LUN0 at a different offset may be allocated from a different storage device that is included in a slower storage tier.

Figure 5:
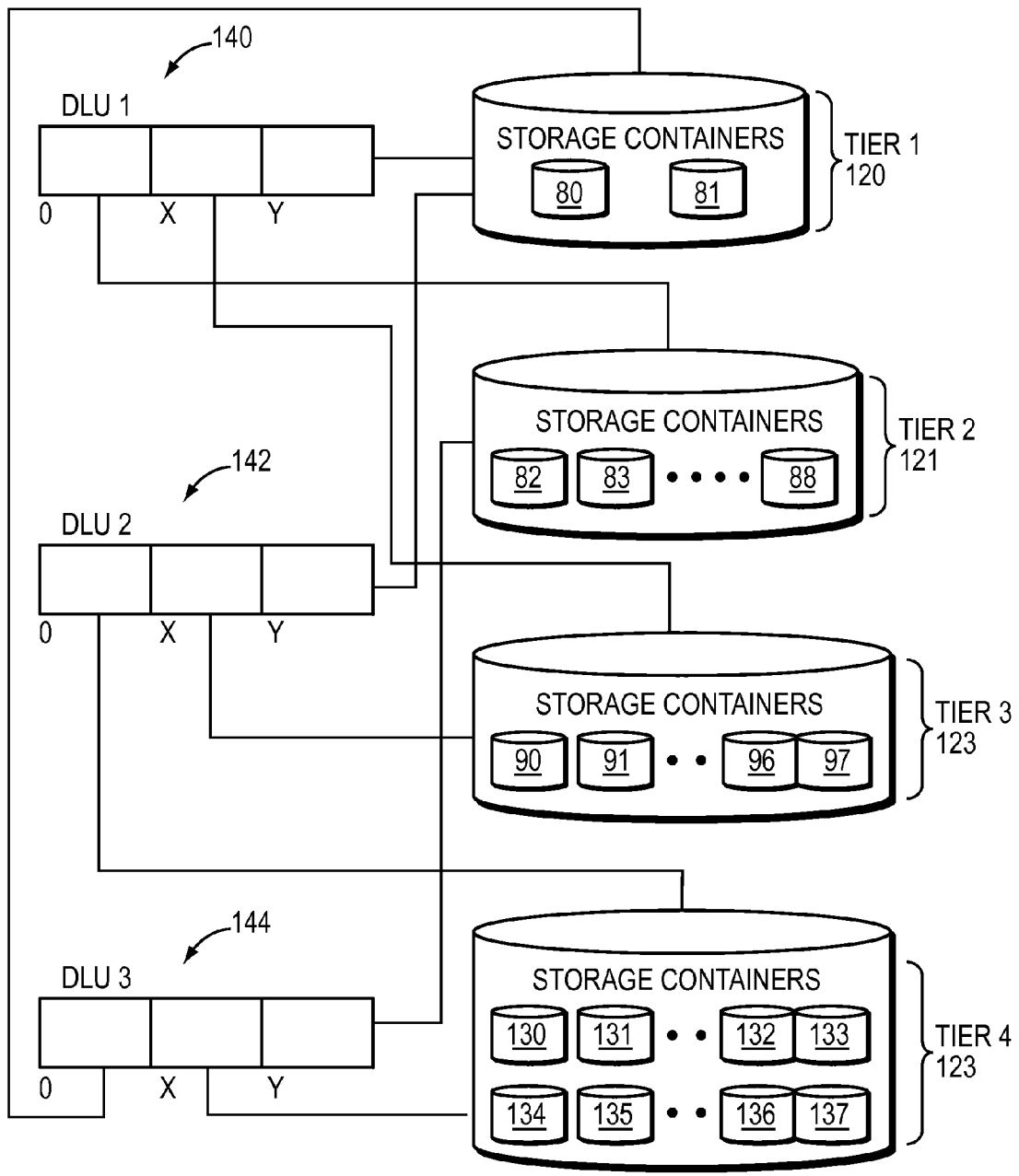
FIGS. 5 and 6 are block diagrams illustrating components that may be used in connection with techniques herein.

Referring to FIG. 5, shown is a more detailed representation of components that may be included in an embodiment using the techniques described herein. Data storage system 12 includes multiple direct logical units (DLUs) 140, 142, 144 and multiple pools of storage in multiple storage tiers 120-123. Direct logical units (DLUs) 140, 142, 144 may appear to a host coupled to the storage system 12 as a logical volume (logical device) containing a contiguous block of data storage, as discussed herein. Each direct logical unit (DLU) 140, 142, 144 may correspond to a particular data device, a portion thereof and/or multiple data devices. Accordingly, each DLU 140, 142, 144 may map to storage areas across multiple storage tiers. As a result, although each DLU 140, 142, 144 may appear as containing a logically contiguous block of storage, each DLU 140, 142, 144 may allow for blocks of data to be transparently stored (and/or retrieved) from discontiguous storage pools made up of the varying types of data storage devices.

In at least some embodiments of the current technique, a storage tier may include one or more storage containers. A storage container may be associated with data devices, such as the physical devices 60a-60b discussed herein, so that, for example, there is one or more data devices for each storage container, one data device for multiple storage containers, any portion of a data device for any portion of the pools of storage for a storage container, and/or any combinations thereof. Further, data devices associated with a storage container may have different characteristics, such as speed, cost, reliability, availability, security and/or other characteristics.

Referring again to FIG. 5, a top tier storage pool 120 (e.g., tier 1) may include storage containers 80-81 having flash/solid state disk (SSD) drives that are relatively fast and expensive. Other storage pools 121-123 (e.g., tiers 2-4) may include storage containers associated with disk drives of decreasing speeds or other configurations (i.e., 15 k rpm, 10 k rpm, 7.5 k rpm redundant array of independent disk (RAID) storage). Storage pool 121 (e.g., tier 2) may include storage containers 82, 83, 88 having disk drives with different RAID levels. Similarly, storage pool 122 (e.g., tier 3) may include storage containers 90, 91, 96, 97 having disk drives with different RAID levels. The lowest tier of storage pool 123 (e.g., tier 4) may include, for example, storage containers 130, 131, 132, 133, 134, 135, 136, 137 having tape storage and largest capacity disk drives (such as massive array of idle disks (MAID) storage). Further, the last storage tier 123 may also include storage devices external to the data storage system 12 that may be suitable for long term storage of data that is infrequently accessed. In at least one embodiment of the current technique, each DLU 140, 142, 144 may be created and configured in such a way that each DLU 140, 142, 144 may include slices from storage containers of different storage tiers based on an offset of a DLU at which a slice is allocated. For example, DLU-1 140 may include a slice from storage container 80 of tier-1 120 at logical offset 0 of DLU-1 140 and another slice from storage container 83 of tier-2 121 at an offset value of 2 gigabyte (2 GB) of DLU-1 140. Thus, in at least one embodiment, for example, a logical volume of size 10 gigabytes (GB) may be configured in such a way that first 5 gigabytes of the logical volume includes slices from a higher storage tier and last 5 gigabytes of the logical volume includes slices from a lower storage tier. In other words, a portion or subset of the logical volume starting from an offset value of 0 includes slices from the higher storage tier and a portion or subset of the logical volume starting from an offset value of 5 gigabytes (GB) includes slices from the lower storage tier.

Figure 6:
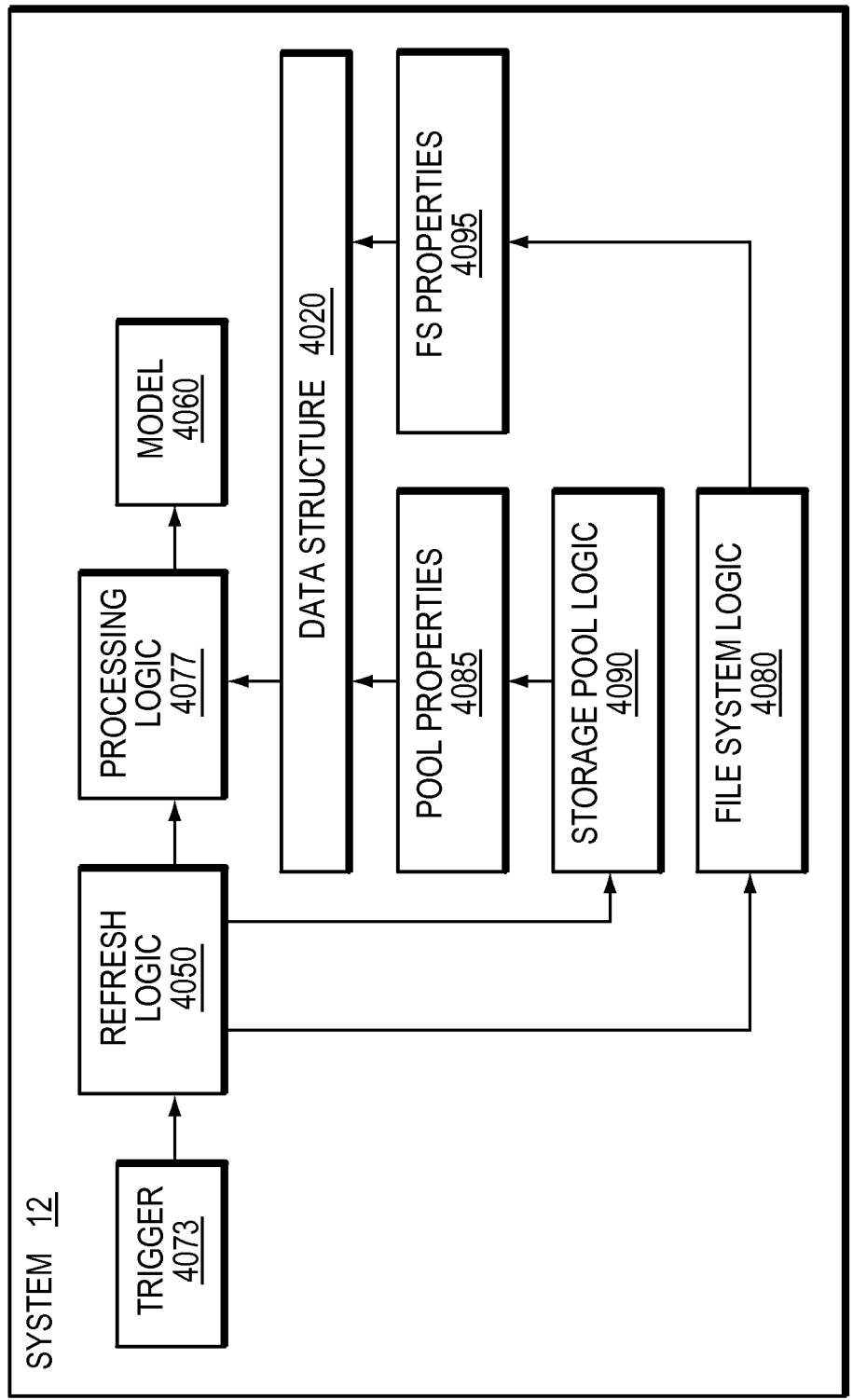

Referring to FIG. 6, shown is a representation of components that may be included in an embodiment using the techniques described herein. In the embodiment as described in more detail below, system 12 has refresh logic 4050 that is responsive to a trigger 4073 to drive file system logic 4080 and storage pool logic 4090 to return respective properties information 4095, 4085 in a data structure 4020. Based on structure 4020, processing logic 4077 updates model 4060 of at least file system and storage pool related objects, which model 4060 is used to support management system 16.

In an example implementation, a mapped LUN driver has refresh logic is triggered by a timer that is scheduled to trigger every two minutes and is queued as an event to an event handler of the mapped LUN driver. (A peer SP's refresh is triggered independently by its own timer.) A file system manager is responsible for pre-allocating a chunk of memory (e.g., for structure 4020) large enough to store the properties (e.g., replica statistics), e.g., for the maximum number of supported file systems. The properties are obtained for all the mounted file systems on the local SP via a get_all_file_system_properties( ) function. The properties may include new replica statistics queried from CBFS including BlocksUsed, PrimaryAllocations, and ReplicaAllocations. These new statistics are added to the file system object and the pool object's data. Once the replica statistics for the local mounted file system objects are updated, the file system manager queues another event to reset the current cached pool replica statistics and update it with the latest values obtained from the file system objects.

Figure 7A:
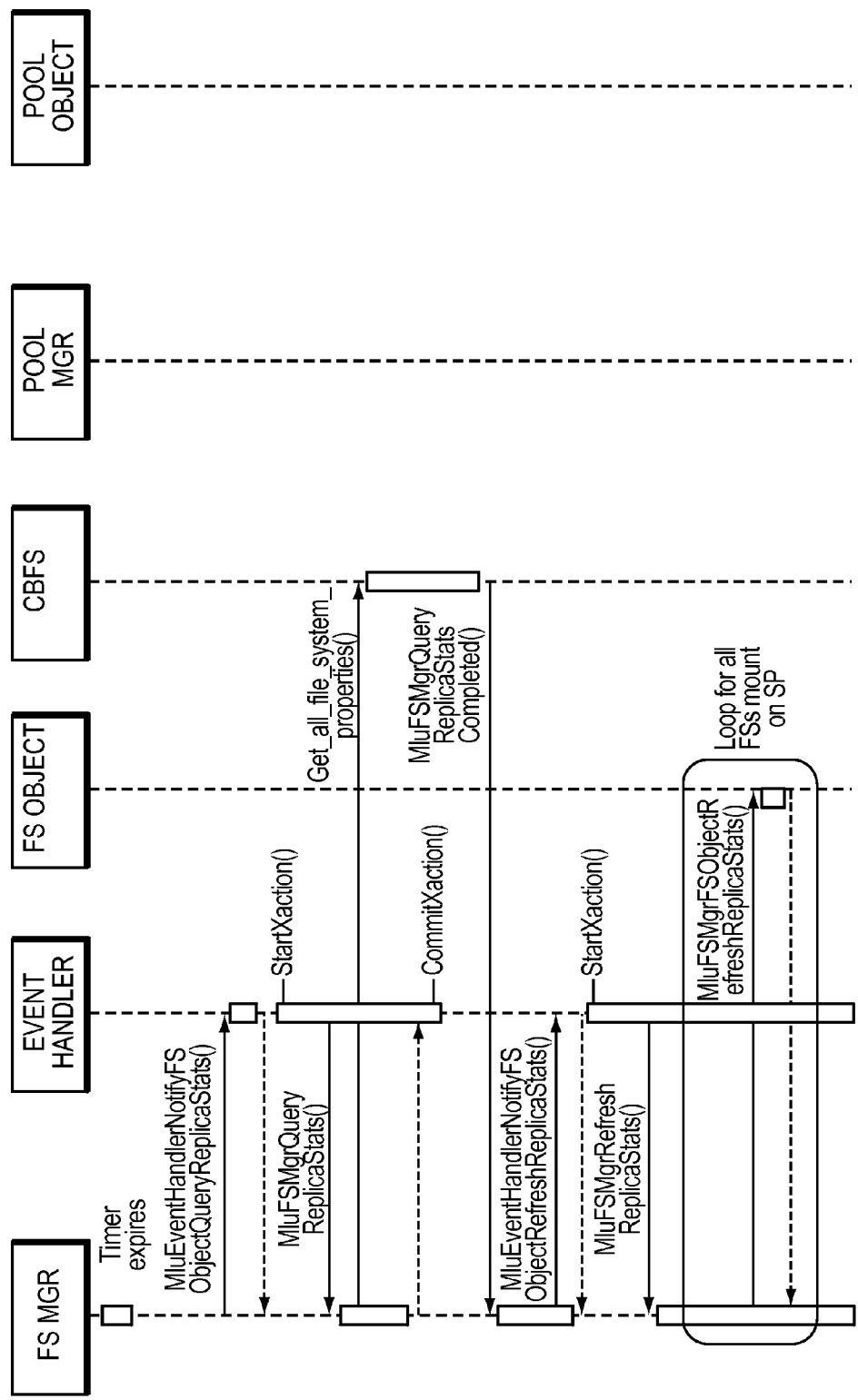
FIGS. 7A and 7B illustrate sequence diagrams describing detailed interactions between components of mapped LUN driver in accordance with techniques herein.
Figure 7B:
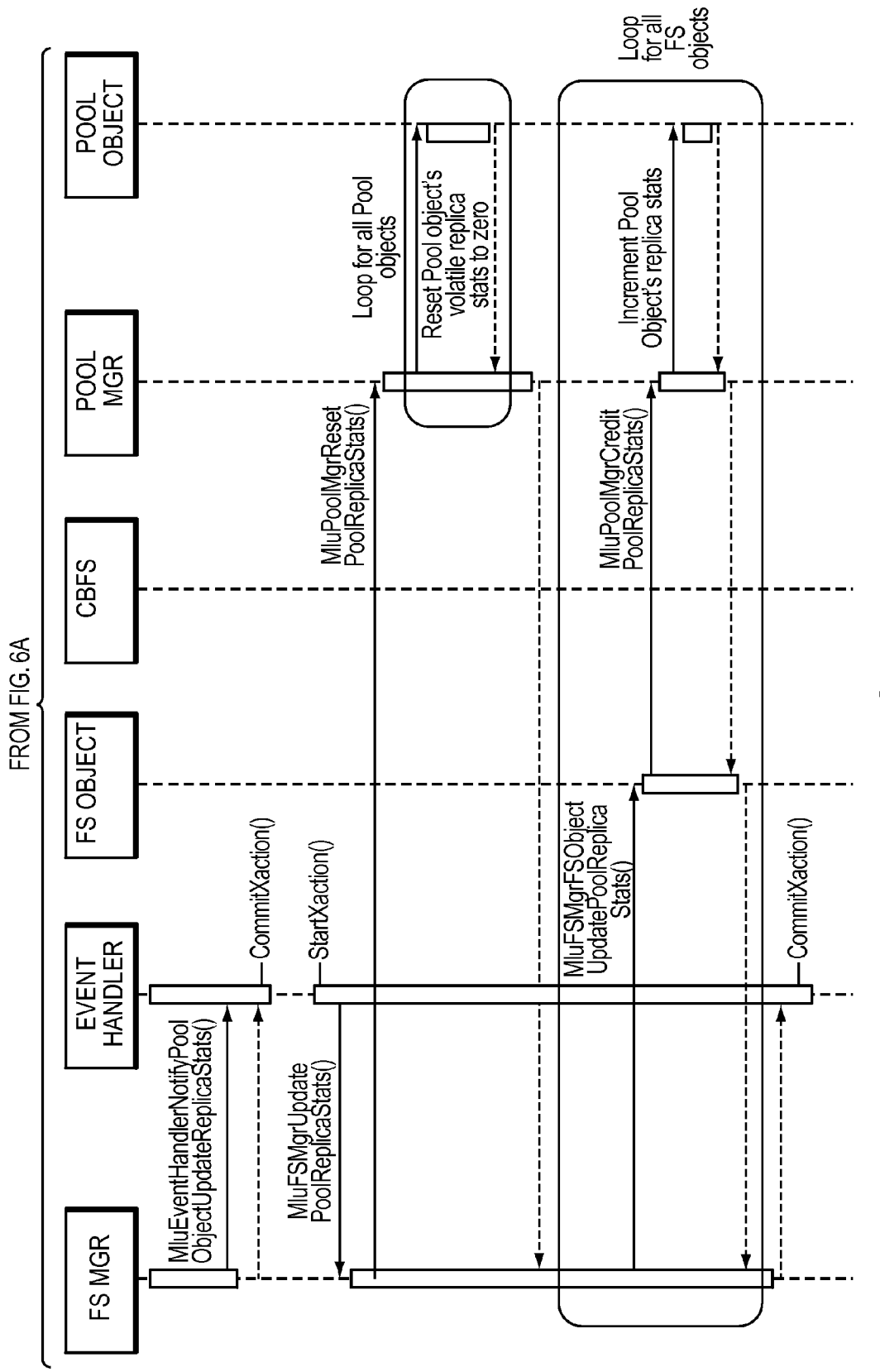

With respect to the example implementation, FIGS. 7A and 7B illustrate sequence diagrams describing detailed interactions between components of the mapped LUN driver. The event handler causes interactions to execute in stages on a transaction basis so that even if the model is not fully up to date, it is internally consistent so that, for example, totals presented reflect the sum of constituent values presented, particularly at the LUN level and at the pool level.

At least some implementations have one or more of the following characteristics.

As property data comes back via structure 4020, processing logic 4077 needs to execute a significant management transaction to process such data and update the cache data. The property data helps the system make available to the user information about not only how much storage is being consumed in total, but also how much is metadata and primary data, and how much storage is consumed by snapshots and how much by primary LUNs. For this property data, it is necessary to get information from CBFS in a way that scales.

One or more APIs between the MLU driver and CBFS have extended capabilities to allow properties to pass in bulk using the refresh mechanism.

Refresh logic 4050 refreshes all properties at the LUN level and the pool level so that the user sees refreshed properties after the next poll by system 16, though it is possible for the user to be presented with at least some data that is minutes old, due to the latency of the poll.

Logic 4077 uses a transaction to take properties and updates the model, to help block other configuration changes from happening to the model while populating across LUNs and pools before committing the transaction, and this is done in stages, so that other work is not blocked for a long time. If other work is not waiting, the system can continuously get all properties of all LUNs for that refresh cycle. If other work is waiting, the current transaction can be dropped and another transaction can be done later.

In particular, when CBFS returns the information, logic 4077 needs to walk through the data, and find the nodes in model that need to be updated accordingly, which involves lookups and searches. Also, logic 4077 makes sure that data is consistent between LUNs and pools even if the model's data is not fully updated. For example, totals at pool levels are kept consistent with LUNs, with respect to the total amount of storage allocated for snapshots and metadata. Therefore, even if logic 4077 gets only the first ten LUNs' properties updated, logic 4077 also updates the pool level as well. The rest of the LUNs may need to be updated through multiple iterations. Also, refresh operations execute independently on the SPs and are directed to each SP's respective LUNs, and may be out of sync with each other, but problems are avoided by keeping data consistent through each transaction. Logic 4077 relies on information about which slices belong to which LUNs and which slices are used for snapshot data, primary data, and metadata.

Logic 4050 is aware of which properties are needed from CBFS, e.g., counters, but the information that is returned is raw and requires manipulation by logic 4077 to a format the user wants to see. Logic 4077 runs equations across the information, combines some of the information, and finds objects where the properties reside and updates those, which takes time, so the use of multiple transactions helps.

Some operations that the user can perform, such as creating a DLU or thick LUN, change the consumption at a pool or LUN level significantly rather than gradually, and therefore trigger 4073 may be tripped immediately rather than waiting for the timer, so that the next poll from system 16 will pick up the changes right away. The immediate trigger may be used with any operation that changes properties dramatically instead of gradually based on single operation, such as creating a DLU as noted above, destroying a DLU, creating a snapshot, and other operation where the user may expect to see the changes reflected instantly. Furthermore, some properties are used for other things and it may be important for the update to occur immediately; for example, the total amount of consumption of a pool may be used for alert purposes regarding about running out of pool space, so if the user creates a DLU, there may be a need to attend to the alert right away.

The length of time between triggers may be based on how long it takes to compete one refresh cycle in a maximum configuration, to help avoid overlapping refresh cycles.

In management software running within its client-server environment, there may be a group of service providers termed "providers", which are delegated specific managerial tasks to perform within the distributed management software of the client-server system, i.e. they are delegated specific services to "provide". Such providers may include: directory provider, persistence (file replication) provider, security provider, snapshot copying (backups and data modeling) provider, mirroring (permanent backup storage) provider, clone (local replication) provider, LUN provider (creates or destroys LUNs), meta LUNs (virtualization) provider, etc. Each provider is concerned only with performing its own prescribed task. These providers are, of course, software entities, but they may be modular in design. They can, therefore, be modularly "plugged" into a software framework allowing easily-made additions to, or reductions of, the overall functionality of the storage system's management software. These providers act upon objects and although each provider is concerned with performing only its own task, it may act upon one or more objects that are also being acted upon by other providers. Thus, there may be dependency or interaction, between certain providers because of objects which are common to those certain providers.

System 16 may be a typical workstation or graphical user interface (GUI) operatively coupled to system 12 which includes a management server. The management server receives input requests and serves up responses to those requests from an array subsystem.

Requests may be honored or responded to. In general, each of the providers is software functionality which acts independently on its own set of objects. For example, a provider may act on a set of LUNs and may know only about its own set of objects or LUNs, but sets of objects for different providers may intersect. Every object initially belongs to one and only one provider, but each object can be referenced by more than one provider, and in that sense, can belong to more than one provider. In other words, each provider can grow its set of objects by extending its domain, or sphere of influence, over objects that initially belonged only to other providers. Every provider can perform operations on all of the objects in its set, regardless of whether that object was in its set initially or resulted from an extension of its domain.

The management server includes CIMOM, a provider framework, and a number of providers. CIMOM is an object manager configured in accordance with the Storage Network Industry Association Common Information Model (SNIA/CIM) standard or protocol and receives client requests. CIMOM provides a framework for services offered by providers that plug into it, such as the provider framework with which it is operatively coupled. A provider is a plug-in into the CIMOM that provides a specific service, such as managing a storage feature.

Providers may be implemented as dynamic link libraries (DLLs) loaded into the CIMOM process. Accordingly, they can "plug in" to provider framework in a modular fashion and are thereby communicatively coupled to CIMOM.

An array administration interface is the interface through which all storage system management is performed, regardless of which array feature or driver may be targeted. The providers are communicatively coupled by way of inter-process communication links to the array administration interface. Thus, on the client side of the interface, it may be accessed using application programmer interface (API) calls. On the array side of the interface it may use IOCTL calls to communicate with the managed drivers.

Several components of system management reside on host computers and are referred to as client components. Components include a command line interface, a host GUI, a host agent, and an event monitor.

At least some management functions are provided by the series of CIMOM providers which are attached to a CIMOM. CIMOM providers may provide, for example, services to manage the configuration and operation of LUNs including mapped LUNs, statistics about performance of traffic on ports on the switch, services to manage the configuration and operation of clones, and services to manage the configuration and operation of mirrors.

The above-described providers periodically poll the system infrastructure to build and update a model such as model 4060 of the existing component configuration and status. If any changes are detected in configuration or status from the existing model, registered observers are notified of the changes and the model is updated with the new model and saved for queries by the provider. The services of these providers can be accessed from other providers by formulating requests and sending them to the CIMOM. This permits providers which require the services of other providers to access those services.

When property data pertaining to an object is received, it is made available to the corresponding provider. When client software needs property data pertaining to the object, the client software makes a request to the software object which represents the object.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing properties collection, the method comprising:
   determining storage objects for which properties information is to be refreshed;
   generating a bulk request for properties information from file systems corresponding to the storage objects;
   issuing the bulk request to the file systems; and
   based on a response to the bulk request, using a blocking transaction to update a model of the storage objects that is made available to management software;
   wherein if other work is waiting, the blocking transaction is dropped and another transaction is done later.

2. The method of claim 1, wherein the properties information is spread over objects within a mapped logical unit number (LUN) driver.

3. The method of claim 1, wherein the properties information is gathered in bulk and aggregated at a useful level and on a configurable interval, in a refresh operation.

4. The method of claim 1, wherein a refresh operation for the properties information is interrupted and restarted.

5. The method of claim 1, wherein refresh logic is responsive to a trigger to drive file system logic and storage pool logic to return the properties information in a data structure.

6. The method of claim 1, wherein, based on the properties information, processing logic updates at least file system and storage pool related objects of the model.

7. The method of claim 1, wherein a mapped logical unit number (LUN) driver has refresh logic that is triggered by a timer that is scheduled to trigger every two minutes and is queued as an event to an event handler of the mapped logical unit number (LUN) driver, and a file system manager preallocates a chunk of memory large enough to store the properties information.

8. The method of claim 1, wherein the properties information comprises replica statistics queried from common block file system (CBFS) and the replica statistics are added to file system object and pool object data.

9. The method of claim 1, wherein the blocking helps block other configuration changes from happening to the model while populating across logical unit numbers (LUNs) and pools before committing the transaction.

10. A system for use in managing properties collection, the system comprising:
   a processor and memory;
   the system configured to:
   determine storage objects for which properties information is to be refreshed;
   generate a bulk request for properties information from file systems corresponding to the storage objects;
   issue the bulk request to the file systems; and
   use, based on a response to the bulk request, a blocking transaction to update a model of the storage objects that is made available to management software;
   wherein if other work is waiting, the blocking transaction is dropped and another transaction is done later.

11. The system of claim 10, wherein the properties information is spread over objects within a mapped logical unit number (LUN) driver.

12. The system of claim 10, wherein the properties information is gathered in bulk and aggregated at a useful level and on a configurable interval, in a refresh operation.

13. The system of claim 10, wherein a refresh operation for the properties information is interrupted and restarted.

14. The system of claim 10, wherein refresh logic is responsive to a trigger to drive file system logic and storage pool logic to return the properties information in a data structure.

15. The system of claim 10, wherein, based on the properties information, processing logic updates at least file system and storage pool related objects of the model.

16. The system of claim 10, wherein a mapped logical unit number (LUN) driver has refresh logic that is triggered by a timer that is scheduled to trigger every two minutes and is queued as an event to an event handler of the mapped logical unit number (LUN) driver, and a file system manager preallocates a chunk of memory large enough to store the properties information.

17. The system of claim 10, wherein the properties information comprises replica statistics queried from common block file system (CBFS) and the replica statistics are added to file system object and pool object data.

18. The system of claim 10, wherein the blocking helps block other configuration changes from happening to the model while populating across logical unit numbers (LUNs) and pools before committing the transaction.

\* \* \* \* \*